(12) United States Patent
Rech et al.

(10) Patent No.: US 11,387,641 B2
(45) Date of Patent: Jul. 12, 2022

(54) FITTING FOR RECEIVING AN INSULATED LEAD AND A METHOD FOR ASSEMBLY THEREOF

(71) Applicant: Chromalox, Inc., Pittsburgh, PA (US)

(72) Inventors: Danny Rech, Viernheim (DE); Walter Baus, Viernheim (DE); Alexander Assmann, Seeon (DE)

(73) Assignee: CHROMALOX, INC., Pittsburgh, PA (US)

( * ) Notice: Subject to any disclaimer, the term of this patent is extended or adjusted under 35 U.S.C. 154(b) by 0 days.

(21) Appl. No.: 16/901,237

(22) Filed: Jun. 15, 2020

(65) Prior Publication Data

US 2021/0391700 A1 Dec. 16, 2021

(51) Int. Cl.
| | |
|---|---|
| *H02G 15/013* | (2006.01) |
| *H01R 4/18* | (2006.01) |
| *H01R 4/70* | (2006.01) |
| *H02G 15/007* | (2006.01) |
| *H02G 15/04* | (2006.01) |
| *H02G 15/115* | (2006.01) |
| *H01R 43/048* | (2006.01) |

(52) U.S. Cl.
CPC ........... *H02G 15/013* (2013.01); *H01R 4/183* (2013.01); *H01R 4/70* (2013.01); *H01R 43/048* (2013.01)

(58) Field of Classification Search
CPC ...... H02G 15/013; H01R 43/048; H01R 4/22; H01R 4/72; H01R 4/70; H01R 4/20; H01R 4/18; H01R 4/10; H01R 4/183
See application file for complete search history.

(56) References Cited

U.S. PATENT DOCUMENTS

| | | | |
|---|---|---|---|
| 2,688,651 A | 9/1954 | Blake | |
| 6,069,320 A * | 5/2000 | Rocci | H01R 4/70 |
| | | | 174/84 R |
| 10,734,753 B1 * | 8/2020 | Alawneh | H02G 15/115 |
| 11,069,997 B1 * | 7/2021 | Taylor | H01R 13/53 |
| 11,070,043 B1 * | 7/2021 | Marbach | H02G 15/007 |

(Continued)

FOREIGN PATENT DOCUMENTS

| | | |
|---|---|---|
| CN | 104836062 A | 8/2015 |
| DE | 29805215 U1 | 7/1999 |
| WO | 2018193399 A1 | 10/2018 |

OTHER PUBLICATIONS

International Search Report and Written Opinion for International Application No. PCT/US2021/033895 dated Sep. 1, 2021.

*Primary Examiner* — Hoa C Nguyen
*Assistant Examiner* — Amol H Patel
(74) *Attorney, Agent, or Firm* — K&L Gates LLP

(57) ABSTRACT

A fitting for receiving an insulated lead and a method for assembly thereof are provided. The fitting comprises an elongate member, a sleeve, a collar, and an insulator. The elongate member comprises a first end, a second end, and an interior surface defining an elongate cavity. The first end is open. The sleeve is configured to receive the insulated lead. The first end is configured to receive the sleeve. The collar is configured to compress the sleeve onto the insulated lead to form a seal between the insulated lead and the elongate member. The insulator is configured to inhibit electrical contact between an inner conductor of the insulated lead and the interior surface of the elongate member.

19 Claims, 5 Drawing Sheets

(56) References Cited

U.S. PATENT DOCUMENTS

| | | | |
|---|---|---|---|
| 2014/0048307 A1 | 2/2014 | Franke et al. | |
| 2016/0380414 A1* | 12/2016 | Harmason | H01R 4/70 29/869 |
| 2020/0303841 A1* | 9/2020 | Doring | H02G 15/115 |
| 2020/0343712 A1* | 10/2020 | Bergsma | H02G 15/013 |
| 2020/0412120 A1* | 12/2020 | Volpone | H01B 7/0045 |

* cited by examiner

FITTING FOR RECEIVING AN INSULATED LEAD AND A METHOD FOR ASSEMBLY THEREOF

FIELD

The present disclosure relates to a fitting for receiving an insulated lead and a method for assembly thereof.

BACKGROUND

Connecting a cold lead to a hot lead of a heat trace cable can require brazing the connection or laser welding to form a hot-cold junction. Forming the hot-cold junction presents challenges.

SUMMARY

In a general aspect, various embodiments of the present invention are directed to a fitting for receiving an insulated lead. The fitting comprises an elongate member, a sleeve, a collar, and an insulator. The elongate member comprises an open first end, an open or closed second end, and an interior surface defining an elongate cavity. The sleeve is configured to receive the insulated lead and the first end of the elongate member is configured to receive the sleeve. The collar is configured to compress the sleeve onto the insulated lead to form a seal between the insulated lead and the elongate member. The insulator inhibits electrical contact between an inner conductor of the insulated lead and the interior surface of the elongate member.

In another general aspect, where the second end of the elongate member is open, the fitting can be used for electrically connecting a first insulated lead to a second insulated lead. In such embodiments, a first sleeve of the fitting is configured to receive the first insulated lead, and the first end of the elongate member is configured to receive the first sleeve. Also, a second sleeve of the fitting is configured to receive the second insulated lead, and the second end of the elongate member is configured to receive the second sleeve. A first collar of the fitting is configured to compress the first sleeve onto the first insulated lead to form a seal between the first insulated lead and the elongate member. Similarly, a second collar of the fitting is configured to compress the second sleeve onto the second insulated lead to form a seal between the second insulated lead and the elongate member. The fitting may further comprise a connector that is configured to be received by the elongate cavity of the elongate member. The connector is configured to electrically connect an inner conductor of the first insulated lead with an inner conductor of the second insulated lead.

In another general aspect, various embodiments of the present invention are directed towards a kit comprising the components of a fitting as described herein and at least three sleeves of different sizes.

In other general aspects, various embodiments of the present invention are directed to methods of connecting an insulated lead to the fitting. The methods comprise the step of compressing the sleeve(s) onto the insulated lead(s) with the collar(s) to form a seal(s) between the insulated lead(s) and the elongate member.

The hot-cold junction created by the fitting and method according to embodiments of the present invention can have a desired operational temperature range, be performed in the field, not require an open flame, lower costs of installation of a heat trace cable, provide protection from the environment, and increase the reliability of a hot-cold junction.

These and other benefits that can be realized with embodiments of the present invention will be apparent from the description that follows.

BRIEF DESCRIPTION OF THE DRAWINGS

The features and advantages of various examples of the present invention, and the manners of attaining them, will become more apparent, and the examples will be better understood, by reference to the following description of examples taken in conjunction with the accompanying drawings, wherein.

Corresponding reference characters indicate corresponding parts throughout the several views. The exemplifications set out herein illustrate certain examples, in one form, and such exemplifications are not to be construed as limiting the scope of the examples in any manner.

DETAILED DESCRIPTION

Figure 1:
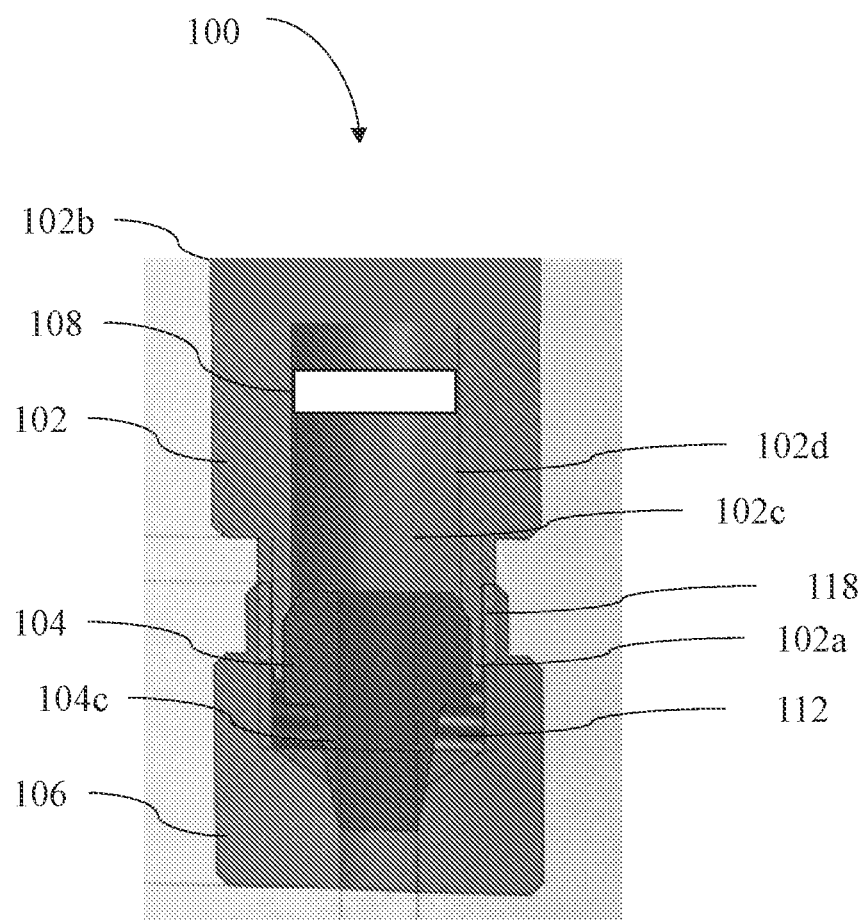
FIG. 1 is a cross-section view of fitting for receiving an insulated lead according to the present disclosure.

Certain exemplary aspects of the present disclosure will now be described to provide an overall understanding of the principles of the composition, function, manufacture, and use of the compositions and methods disclosed herein. An example or examples of these aspects are illustrated in the accompanying drawings. Those of ordinary skill in the art will understand that the compositions, articles, and methods specifically described herein and illustrated in the accompanying drawings are non-limiting exemplary aspects and that the scope of the various examples of the present invention is defined solely by the claims. The features illustrated or described in connection with one exemplary aspect may be combined with the features of other aspects. Such modifications and variations are intended to be included within the scope of the present invention.

A heat trace cable can comprise a controller lead, an insulated cold lead, and an insulated hot lead. The controller lead can be electrically connected to a heating controller and the insulated cold lead in order to provide power to the conductor of the heat trace cable. The insulated cold lead can be operatively coupled to the insulated hot lead of the heat trace cable.

Each lead can comprise an outer protective layer, an inner conductor, and an insulator layer (e.g., a mineral layer, such as, for example, magnesium oxide) intermediate the inner conductor and the outer protective layer. Each lead can comprise a single inner conductor (e.g., mono-conductor lead) or multiple inner conductors. The outer protective layer can comprise a metal and/or a polymer. The inner conductor of the insulated cold lead and the inner conductor of the insulated hot lead are typically formed from different electrically-conductive materials and/or are made a different size such that they generate heat at different rates when a similar current passes through the conductors. Typically, the insulated cold and hot leads are formed individually in different processes and then joined together in a secondary process, such as, for example, by brazing or laser welding an end of the conductor of the insulated cold lead to an end of the conductor of the insulated hot lead to form a hot-cold junction. The hot-cold junction can be susceptible to environmental damage (e.g., corrosion), breakage if not reliably formed, and/or shorting.

A hot-cold junction formed by brazing can be fragile, require the use of an open flame to create the connection, and have a limited operating temperature range. A hot-cold junction formed by laser welding can be fragile, non-repairable, require a specialized facility, and require extensive training for an operator to create the laser-welded connection. Therefore, the present invention provides, in various embodiments, a fitting for receiving an insulated lead and a method of assembly thereof. The fitting and method can form an end cap on an insulated lead, provide a hot-cold junction between an insulated hot lead and an insulated cold lead, provide a hot-hot junction between two insulated hot leads, or provide a cold-cold junction between two insulated cold leads. The hot-cold junction created by the fitting and method according to embodiments of the present invention can have a desired operational temperature range, be performed in the field, not require an open flame, lower costs of installation of a heat trace cable, provide protection from the environment, simplify the knowledge and skill set required of the operator to perform the connection, and increase the reliability of the hot-cold junction.

FIG. 1 is a cross-sectional diagram of a fitting 100 according to various embodiments of the present invention for receiving an insulated lead (e.g., insulated hot lead, insulated cold lead). For example, the fitting 100 can be configured to form an end cap on an insulated lead of a heat trace system. The fitting 100 can comprise an elongate member 102, a first sleeve 104, a first collar 106, and a first insulator 108. The elongate member 102 comprises a first end 102a, a second end 102b (spaced apart from the first end 102a), and an interior surface 102d defining an internal, elongate cavity 102c. The elongate member 102 can be tubular shaped, such as, for example round tubular shaped, polygonal tubular shaped (e.g., triangular, square, pentagonal, hexagonal), or a combination thereof (e.g., round with flat portions). Additionally, the first sleeve 104 can be tubular shaped. The first end 102a can be configured to receive the first sleeve 104. For example, as illustrated in FIG. 1, the first end 102a can be open such that the first sleeve 104 can be at least partially disposed within the elongate cavity 102c. In various examples, the second end 102b can be closed.

The first sleeve 104 can be configured to receive the insulated lead (not shown). For example, the first sleeve 104 can have an internal cavity 104c extending through the first sleeve 104 that is sized to receive the insulated lead. The dimension of the cavity 104c can be at least the diameter of the insulated lead. The first sleeve 104 and the elongate member 102 can be separate pieces as illustrated in FIG. 1, or the first sleeve 104 and the elongate member 102 can be integral (not shown).

The first collar 106 can be configured to compress the first sleeve 104 onto the insulated lead to form a seal between the insulated lead and the elongate member 102. The seal can protect the portion of the insulated lead within the elongate cavity 102c. For example, if at least a portion of the inner conductor of an insulated lead is exposed on an end of the insulated lead, the exposed portion can be disposed inside the elongate cavity 102c, which can protect the exposed portion from grounding (e.g., shorting) and/or the seal can create a closed system within the elongate cavity 102c such that exposure of the inner conductor to the environment is inhibited.

The first collar 106 can comprise internal threads 112, and the first end 102a can comprise external threads 118 suitable to receive the internal threads 112 of the first collar 106 such that the first collar 106 can be threaded to the first end 102a of the elongate member 102. Thus, the first collar 106 can be rapidly and easily installed onto the elongate member 102 with simple tools (e.g., a wrench, a socket, a ratchet).

In various examples, it may be desired to apply a predetermined level of torque to the first collar 106. For example, a level of torque less than the predetermined level may not seal and a level of torque greater than the predetermined level of torque may damage the fitting 100. Thus, in various examples, the elongate member 102 and/or the first collar 106 can comprise a stop feature which can inhibit torque from being applied beyond the predetermined level of torque or a visual indicator on the elongate member 102 and/or first collar 106 to indicate when the predetermined level torque has been reached. For example, the threads of the first collar 106 and/or the elongate member 102 can comprise a stop feature.

The first insulator 108 can be configured to inhibit electrical contact between an inner conductor of the insulated lead and the interior surface 102d of the elongate member 102. The first insulator 108 can comprise a tubular shape or a disk shape, such that the inner conductor of the inserted insulated lead is disposed in the first insulator 108, thereby insulating the inner conductor of the inserted insulated lead from the elongate member 102. For example, a tubular-shaped insulator 108 can be disposed proximal to the second end 102b and intermediate the insulated lead and the interior surface 102d of the elongate member 102. In various other examples, the first insulator 108 can be a tape (polymeric tape such as, for example, Kapton tape (polyamide film)) or a powder.

The first insulator 108 can comprise a material with a low electrical conductivity, e.g., an insulator, such as, for example, ceramic, glass, an insulative polymer (e.g., polyamide, rubber), or a combination thereof. The elongate member 102 and the first collar 106 can comprise metal; and the first sleeve 104 can comprise graphite or metal. The materials of the fitting 100 can be selected such that the fitting 100 can operate at a temperature of greater than 600 degrees Fahrenheit, such as, for example, greater than 700 degrees Fahrenheit, greater than 800 degrees Fahrenheit, or greater than 900 degrees Fahrenheit.

Figure 3A:
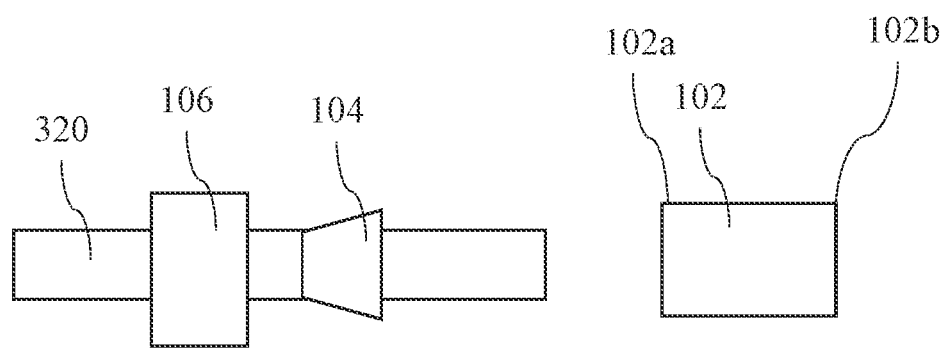
FIGS. 3A-3B illustrate a method of connecting an insulated lead to the fitting of FIG. 1 according to the present disclosure.
Figure 3B:
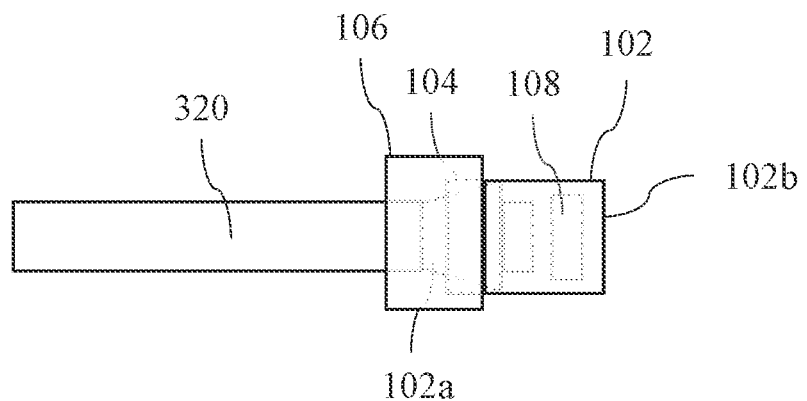

Referring to FIGS. 3A-3B a method for connecting a first insulated lead 320 to the fitting 100 is provided. For example, the method can form an end cap on the first insulated lead 320 utilizing the fitting 100. In various examples, the first insulated lead 320 is part of a heat trace system.

Referring to FIG. 3A, the first insulated lead 320 can be first treaded through the first collar 106, then through the sleeve cavity 104c of the first sleeve 104. Thereafter, referring to FIG. 3B, the first insulated lead 320 can be disposed into the elongate cavity 102c by passing the first insulated lead 320 through the first end 102a of the elongate. The first insulator 108 can be disposed intermediate the first insulated lead 320 and the second end 102b of the elongate member 102. Thereafter, the first collar 106 is threaded onto the elongate member 102, thereby compressing the first sleeve 104 onto the first insulated lead 320 to form a seal between the first insulated lead 320 and the elongate member 102. In various embodiments, the first collar 106 can be threaded onto the elongate member by torqueing with simple tools.

Figure 2:
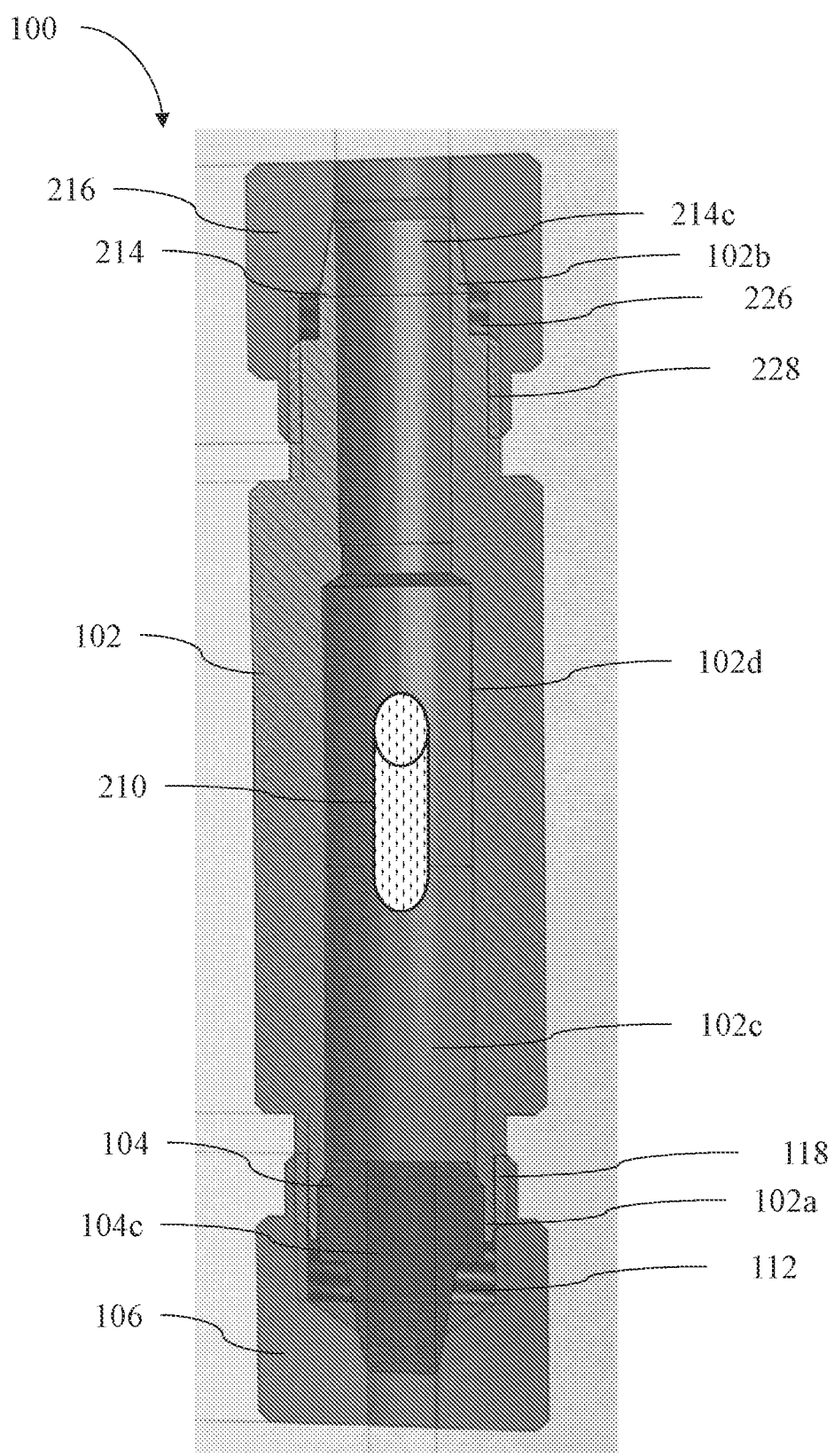
FIG. 2 is a cross-section view of fitting for electrically connecting a first insulated lead to a second insulated lead.

In FIG. 1, the second end 102b is closed. In other embodiments, such as shown in FIG. 2, the second end 102b of the fitting 100 can receive a second insulated lead such that the fitting 100 can be used for electrically connecting a first insulated lead to a second insulated lead is provided. For example, the fitting 100 can be configured to form a hot-cold junction in a heat trace system. The fitting 100 can further comprise a second sleeve 214, a second collar 216, and a connector 210. The second end 102b of the elongate member 102 can be configured to receive the second sleeve 214. For example, as illustrated in FIG. 2, the second end 102b can be open such that the second sleeve 214 can be at least partially disposed within the elongate cavity 102c. In various examples, the second sleeve 214 can be tubular shaped.

The second sleeve 214 can be configured to receive the second insulated lead. For example, the second sleeve 214 can have a interior cavity 214c extending through the second sleeve 214 that is sized to receive the second insulated lead. The dimension of the cavities 104c and 214c can be at least the diameter of the respective insulated lead. The first sleeve 104 and the second sleeve 214 can be separate pieces from each other and separate pieces from the elongate member, or, in other embodiments, the first sleeve 104 and/or the second sleeve 214 can be integral with the elongate member 102. For example, as illustrated in FIG. 2, the first sleeve 104 is separate from the elongate member 102 and the second sleeve 214 is integral with the elongate member 102.

The first sleeve 104 and the second sleeve 214 can be different sizes or the same size. For example, each sleeve 104 and 214 can be sized depending on the insulated lead to be received. In various examples, a kit can comprise the fitting 100 and at least three different sleeves of different sizes as shown in FIG. 4D (e.g., first sleeve 104, second sleeve 214, third sleeve 434). Therefore, the sleeve size can be chosen for the desired application and/or insulated lead to be received.

Like the first collar 106, the second collar 216 can be configured to compress the second sleeve 214 onto the second insulated lead to form a seal between the second insulated lead and the elongate member 102. The seals can protect the portion of the respective insulated leads within the elongate cavity 102c and/or electrical connection formed therebetween.

Also like the first collar 106, the second collar 216 can comprise internal threads 226 and the second end 102b can comprise external threads 228 suitable to receive the internal threads 226 of the second collar 216. Thus, the collars 106 and 216 can be rapidly installed onto the elongate body 102 with simple tools.

The connector 210 can be configured to electrically connect the inner conductor of the first insulated lead with an inner conductor of a second insulated lead. The connector 210 can comprise an electrically conductive material that can be deformed to contact the inner conductor of the first insulated lead and the inner conductor of the second insulated lead. For example, the connector 210 can be a crimp connector. Thus, the electrical connection can be formed by simple tools (e.g., crimpers, pliers) in the field and with minimal training.

The connector 210 can be independently moveable from the elongate member 102 and can be configured to be received by elongate cavity 102c. For example, the connector 210 can be utilized to form the electrical connection between the inner conductor of the first insulated lead with an inner conductor of a second insulated lead and thereafter disposed inside of the elongate cavity 102c. For example, the first end 102a and/or the second end 102b can be configured to receive the connector 210 such that the electrical connection can be formed outside of the elongate cavity 102c and then one of the insulated leads can be threaded through the elongate member 102 until the electrical connection is disposed inside of the elongate cavity 102c. The positioning of the electrical connection within the elongate cavity 102c can protect the electrical connection from environmental conditions. In various examples, the connector 210 can comprise an insulative outer layer such that the inner, conductive portion of the connector 210 is electrically insulated from the elongate member 102. In certain examples where the connector 210 does not comprise an insulative outer layer, the fitting 100 can be configured to position the connector 210 a dielectric distance from the interior surface 102d of the elongate member such that electrical contact is inhibited between the interior surface 102d of the elongate member and the connector 210.

In various examples, the fitting 100 can comprise a first insulator (e.g., first insulator 108 as illustrated in FIG. 4) configured to inhibit electrical contact between the interior surface 102d of the elongate member 102 and the connector 210, the inner conductor of the first insulated lead, and/or the inner conductor of the second insulation lead. For example, the first insulator can comprise a tubular shape configured to at least partially receive the electrical connection and inhibit the electrical connection from contacting the interior surface 102d. The first insulator can be positioned intermediate the electrical connection comprising the connector 210 and the interior surface 102d.

In various examples, referring to FIG. 4D, the fitting 100 can comprise at least two insulators, including the first insulator 108 and a second insulator 436. The second insulator 436 can be configured to inhibit electrical communication between the interior surface 102d of the elongate member 102 and the connector 210, the inner conductor of the first insulated lead, and/or the inner conductor of the second insulation lead. The first insulator 108 and the second insulator 436 can be the same size or different sizes. For example, the first insulator 108 can be sized to receive at least a portion of the first insulated lead, and the second insulator 436 can be sized to receive at least a portion of the second insulated lead.

Figure 4A:
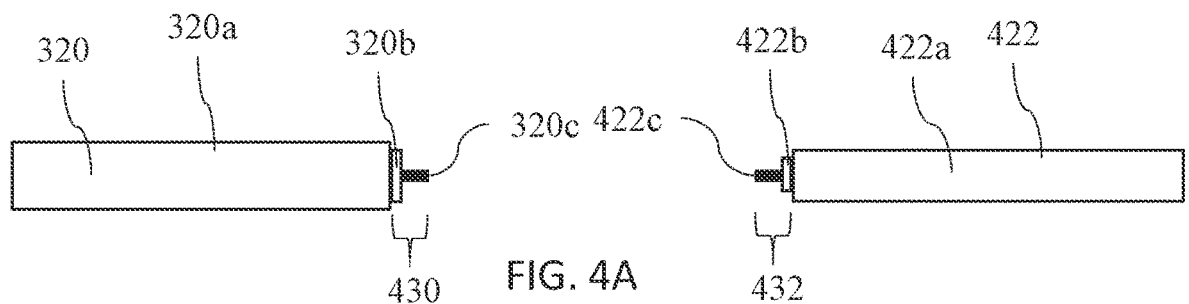
FIGS. 4A-4C illustrate a method of electrically connecting a first insulated lead to a second insulated lead according to the present disclosure.
Figure 4B:
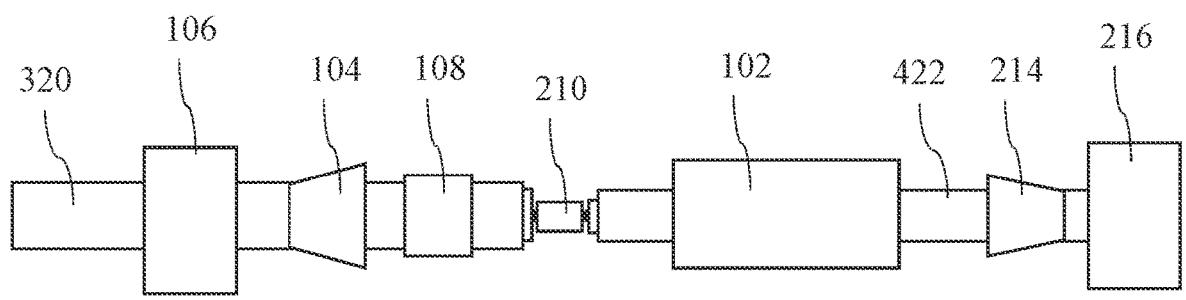
Figure 4C:
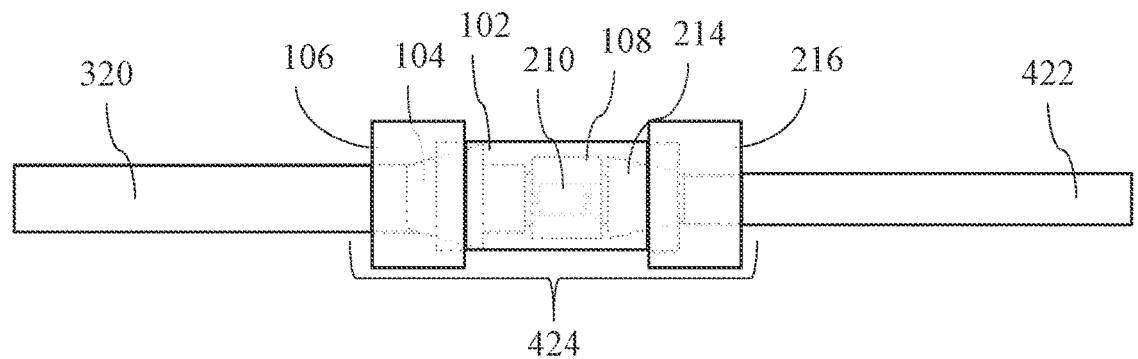
Figure 4D:
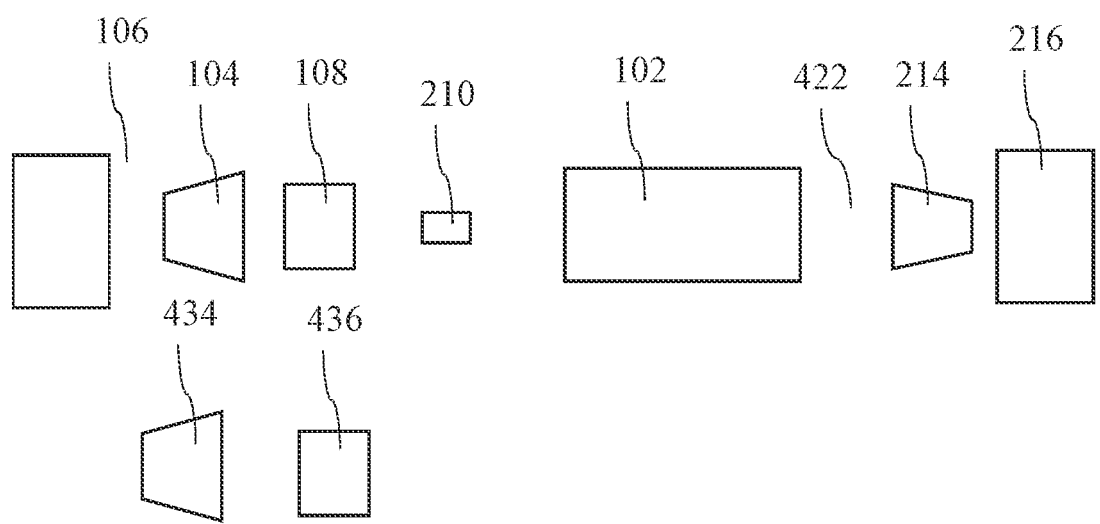
FIG. 4D illustrates a kit according to the present disclosure.

Referring to FIGS. 4A-C, a method for electrically connecting a first insulated lead 320 to a second insulated lead 422 utilizing the fitting 100 of FIG. 2 is provided. For example, the method can form a hot-cold junction utilizing the fitting 100 of FIG. 2 between the first insulated lead 320 and the second insulated lead 422. For example, one of the first insulated lead 320 and the second insulated lead 422 can be a hot section of a heat trace system and the other can be a cold section of a heat trace system.

Referring to FIG. 4A, the end of the first insulated lead 320 to be inserted into the fitting 100, portions of an outer layer 320a and an inner insulating (e.g., magnesium oxide) layer 320b of the first insulated lead 320 can be removed to form an exposed region 430 that exposes the inner conductor 320c of the first insulated lead 320. Similarly, the end of the second insulated lead 422 to be inserted into the fitting 100, portions of an outer layer 422a and an inner insulating (e.g., magnesium oxide) layer 422b of the second insulated lead 422 can be removed to form an exposed region 432 that exposes the inner conductor 422c of the second insulated lead 422. The collective length of the exposed inner conductors 320c, 422c should not be longer than the length of the elongate cavity 102c.

Referring to FIG. 4B, the first collar 106 can be disposed on the first insulated lead 320 prior to disposing the first insulated lead 320 into the first sleeve cavity 104c, and the second collar 216 can be disposed on the second insulated lead 422 prior to disposing the second insulated lead 422 into the second sleeve cavity 214c. Thereafter, the first insulated lead 320 can be threaded into the first sleeve cavity 104c of the first sleeve 104 of the fitting 100. Similarly, the second insulated lead 422 can be threaded into the second sleeve cavity 214c of the second sleeve 214 of the fitting 100.

In various examples, the first insulator 108 can be disposed on the first insulated lead 320 as shown or on the second insulated lead 422 (not shown) prior to forming an electrical connection. In various examples, the elongate member 102 can be disposed on the second insulated lead 422 as shown or on the first insulated lead 320 (now shown) prior to forming an electrical connection. The first sleeve 104 can be positioned intermediate the first collar 106, and the elongate member 102 and the second sleeve 214 can be positioned intermediate the second collar 216 and the elongate member 102.

The inner conductor 320c of the first insulated lead 320 can be electrically connected to the inner conductor 422c of the second insulated lead 422 utilizing the connector 210. For example, electrically connecting the inner conductors 320c and 422c can comprise crimping the connector 210 onto the inner conductor 320c and the inner conductor 422c. After the electrical connection is formed between the inner conductors 320c and 422c, the fitting 100 can be assembled over the electrical connection to protect the electrical connection, since the fitting 100 was disposed over the insulated leads 320 and 422 prior to forming the electrical connection.

Referring to FIG. 4C, the connector 210 and electrical connection formed therefrom can be disposed into the elongate cavity 102c of the fitting 100 by passing the connector 210 through the first end 102a or second end 102b of the elongate member 102. In various examples, the connector 210, the inner conductor 320c, and/or inner conductor 422c can be disposed within the first insulator 108, and the first insulator can be disposed into the elongate cavity 102c by passing the first insulator 108 through the first end 102a or the second end 102b of the elongate member 102. The first insulator 108 can be disposed intermediate the connector 210 and the interior surface 102d of the elongate member 102.

Referring to FIG. 4C, the insulated lead 320 and the second insulated lead 422 can be disposed into the elongate cavity 102c by passing the insulated leads 320 and 422 through the first end 102a or the second end 102b of the elongate member 102. Thereafter, the collars 106 and 216 can be threaded onto the elongate member 102, thereby compressing the respective sleeve 104 and 214 onto the respective insulated lead 320 and 422 to form a seal between the insulated leads 320 and 422 and the elongate member 102. After electrically connecting the inner conductors 320c and 422c and assembling the fitting 100, a hot-cold junction 424 can be formed.

The materials of the fitting 100 can enable the hot-cold junction 424 to operate at a desired operational temperature range. Since the fitting 100 can be installed with simple tools and may not require the use of open flames, the hot-cold junction 424 can be formed in the field with simple tools and may be performed in explosive atmospheres. Additionally, since the assembly of the fitting 100 can be performed with minimal training and simple tools, the cost of installation of a heat trace system can be lower. Further, bending and/or shearing forces on the hot-cold junction 424 can be transferred through the elongate member 102, since the sleeves 104 and 214 are compressed onto the insulated leads 320 and 422, which can increase the reliability of the electrical connection.

In certain examples, for explosive atmospheres, the elongate member 102 can be configured to comprise minimal, if any, internal space such that explosive gas can be inhibited from entering the elongate cavity 102c within the elongate member 102. For example, the elongate cavity 102c of the elongate member 102 can be filled with insulating material. In various examples, the elongate member 102 can be configured with a predetermined (e.g., limited) number of threads that engage with the collars 106 and/or 216 in order to create a defined (e.g., safe) flamepath.

With respect to the appended claims, those skilled in the art will appreciate that recited operations therein may generally be performed in any order. Also, although various operational flows are presented in a sequence(s), it should be understood that the various operations may be performed in other orders than those that are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various examples have been described herein, many modifications, variations, substitutions, changes, and equivalents to those examples may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed examples. The following claims are intended to cover all such modification and variations.

In various examples, the elongate member can comprise two sections. A first section of the elongate member 102 can comprise the first end 102a and a second section of the elongate member 102 can comprise the second end 102b. The first and second sections can releasably engage with each other. For example, the first section can comprise threads and the second section can comprise matching threads. The first section can be installed on a first insulated lead and the second section can be installed on a second insulated lead. Thereafter, inner conductors of the insulated leads can be electrically connected with a connector and the first and second sections can be threadably engaged with one another.

Various aspects of the invention according to the present disclosure include, but are not limited to, the aspects listed in the following numbered clauses.

1. A fitting for receiving an insulated lead, the fitting comprising:

an elongate member comprising a first end, a second end, and an interior surface defining an elongate cavity, wherein the first end is open;

an sleeve configured to receive the insulated lead, wherein the first end of the elongate member is configured to receive the sleeve;

a collar configured to compress the sleeve onto the insulated lead to form a seal between the insulated lead and the elongate member; and an insulator configured to inhibit electrical contact between an inner conductor of the insulated lead and the interior surface of the elongate member.

2. The fitting of clause 1, wherein the sleeve and the elongate member are separate pieces.

3. The fitting of any one of clauses 1-2, wherein the insulator comprises a disk insulator, a tubular insulator, a tape insulator, a powder insulator, or a combination thereof.

4. The fitting of any one of clauses 1-3, wherein the second end is closed.

5. The fitting of any one of clauses 1-4, wherein the elongate member comprises metal.

6. The fitting of any one of clauses 1-5, wherein the collar comprises internal threads and the first end comprises external threads suitable to receive the internal threads of the collar.

7. A fitting for electrically connecting a first insulated lead to a second insulated lead, the fitting comprising:
an elongate member comprising an open first end, an open second end, and an interior surface defining an elongate cavity;
a first sleeve configured to receive the first insulated lead, wherein the first end is configured to receive the first sleeve;
a second sleeve configured to receive the second insulated lead, wherein the second end is configured to receive the second sleeve;
a first collar configured to compress the first sleeve onto the first insulated lead to form a seal between the first insulated lead and the elongate member;
a second collar configured to compress the second sleeve onto the second insulated lead to form a seal between the second insulated lead and the elongate member; and
a connector configured to be received by elongate cavity, the connector configured to electrically connect an inner conductor of the first insulated lead with an inner conductor of the second insulated lead.

8. The fitting of clause 7, further comprising a first insulator comprising a tubular shape and configured to inhibit electrical contact between the interior surface of the elongate member and one or more of the connector, the inner conductor of the first insulated lead, and the inner conductor of the second insulation lead.

9. The fitting of any one of clauses 7-8, wherein the first insulator comprises ceramic, glass, an insulative polymer, or a combination thereof.

10. The fitting of any one of clauses 7-9, further comprising a second insulator configured to inhibit electrical contact between the interior surface of the elongate member and one or more of the connector, the inner conductor of the first insulated lead, and the inner conductor of the second insulation lead.

11. The fitting of clause 10, wherein the first insulator and the second insulator are different sizes.

12. The fitting of any one of clauses 7-11, wherein the connector is a crimp connector.

13. The fitting of any one of clauses 7-12, wherein the fitting is configured to form a hot-cold junction, a hot-hot junction, a cold-cold junction, or a combination thereof.

14. The fitting of any one of clauses 7-13, wherein the first sleeve and the second sleeve are different sizes.

15. The fitting of any one of clauses 7-13, wherein the first sleeve and the second sleeve are the same size.

16. The fitting of any one of clauses 7-15, wherein the first end, the second end, or a combination thereof is configured to receive the connector.

17. The fitting of any one of clauses 7-16, wherein at least one of the first collar and the second collar comprises internal threads and at least one of the first end and the second end comprises external threads suitable to receive the internal threads.

18. The fitting of any one of clauses 7-17, wherein the elongate member comprises a metal.

19. The fitting of any one of clauses 7-18, wherein the fitting comprises one or more of a metal, a graphite, and a ceramic.

20. A kit comprising the fitting of any one of clauses 7-20 and at least three sleeves of different sizes, including the first sleeve and the second sleeve.

21. A method comprising:
disposing an insulated lead into a sleeve cavity of an sleeve of a fitting and into an elongate cavity of the fitting, the fitting comprising:
an elongate member comprising a first end, a second end, and an interior surface defining the elongate cavity, wherein the first end is open;
the sleeve;
a collar; and
an insulator configured to inhibit electrical contact between an inner conductor of the insulated lead and the interior surface of the elongate member; and
compressing the sleeve onto the insulated lead with the collar to form a seal between the insulated lead and the elongate member.

22. The method of clause 21, wherein the collar comprises internal threads and the first end comprises external threads suitable to receive the internal threads of the collar, and compressing the sleeve onto the insulated lead comprises torqueing the collar onto the first end of the elongate member.

23. The method of any one of clauses 21-22, further comprising removing at least a first region of an outer layer of the insulated lead to from an exposed region.

24. A method comprising:
disposing a first insulated lead into a sleeve cavity of a first sleeve of a fitting and a second insulated lead into a sleeve cavity of a second sleeve of the fitting, the fitting comprising:
an elongate member comprising a first end, a second end, and an interior surface defining an elongate cavity, wherein the first end and second end are open;
the first sleeve and the second sleeve; and
a first collar and a second collar;
electrically connecting an inner conductor of the first insulated lead and an inner conductor of the second insulated lead utilizing a connector;
disposing the connector into the elongate cavity of the fitting;
compressing the first sleeve onto the first insulated lead with the first collar to form a seal between the first insulated lead and the elongate member; and
compressing the second sleeve onto the second insulated lead with the second collar to form a seal between the second insulated lead and the elongate member.

25. The method of clause 24, wherein the first collar comprises internal threads and the first end comprises external threads suitable to receive the internal threads of the first collar, and compressing the first sleeve onto the first insulated lead comprises torqueing the first collar onto the first end of the elongate member.

26. The method of any one of clauses 24-25, further comprising removing at least a first region of an outer layer of the first insulated lead, the second insulated lead, or a combination thereof, to from an exposed region comprising the inner conductor of the respective insulated lead.

27. The method of any one of clauses 24-26, further comprising:
disposing the connector, the inner conductor of the first insulated lead, the second insulated lead, or a combination thereof into a first insulator; and
disposing the first insulator into the elongate cavity of the fitting.

28. The method of clauses 24-27, wherein the electrically connecting comprises crimping the connector onto the inner conductor of the first insulated lead and the inner conductor of the second insulated lead.

Various features and characteristics are described in this specification to provide an understanding of the composition, structure, production, function, and/or operation of the invention, which includes the disclosed compositions, coatings, and methods. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims and will comply with the written description, sufficiency of description, and added matter requirements.

Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameters.

Notwithstanding that numerical ranges and parameters setting forth the broad scope of the invention are approximations, numerical values set forth in the specific examples are reported precisely as possible. Any numerical value, however, inherently contains certain errors necessarily resulting from the standard variation found in its respective testing measurements.

Reference throughout the specification to "various examples," "some examples," "one example," "an example," or the like means that a particular feature, structure, or characteristic described in connection with the example is included in an example. Thus, appearances of the phrases "in various examples," "in some examples," "in one example," "in an example," or the like in places throughout the specification are not necessarily all referring to the same example. Furthermore, the particular features, structures, or characteristics may be combined in any suitable manner in an example or examples. Thus, the particular features, structures, or characteristics illustrated or described in connection with one example may be combined, in whole or in part, with the features, structures, or characteristics of another example or other examples without limitation. Such modifications and variations are intended to be included within the scope of the present examples.

Whereas particular examples of this invention have been described above for purposes of illustration, it will be evident to those skilled in the art that numerous variations of the details of the present invention may be made without departing from the invention as defined in the appended claims.

While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

It is understood that the inventions described in this specification are not limited to the examples summarized in this Summary. Various other aspects are described and exemplified herein.

What is claimed is:

1. A fitting for electrically connecting a first insulated lead to a second insulated lead in a heat trace cable, the fitting comprising:
an elongate member comprising an open first end, an open second end, and an interior surface defining an elongate cavity;
a first sleeve configured to receive the first insulated lead, wherein the first end is configured to receive the first sleeve;
a second sleeve configured to receive the second insulated lead, wherein the second end is configured to receive the second sleeve, wherein the first sleeve and the second sleeve are different sizes;
a first collar configured to compress the first sleeve onto the first insulated lead to form a seal between the first insulated lead and the elongate member;
a second collar configured to compress the second sleeve onto the second insulated lead to form a seal between the second insulated lead and the elongate member;
a connector configured to be received by elongate cavity, the connector configured to electrically connect an inner conductor of the first insulated lead with an inner conductor of the second insulated lead, wherein the fitting is configured to operate at a temperature greater than 700 degrees Fahrenheit; and
a first insulator configured to inhibit electrical contact between the interior surface of the elongate member and one or more of the connector, the inner conductor of the first insulated lead, and the inner conductor of the second insulation lead,
wherein the fitting is configured to form a hot-cold junction.

2. The fitting of claim 1, wherein the first insulator comprises a tubular insulator, a tape insulator, a powder insulator, or a combination thereof.

3. The fitting of claim 2, wherein the first insulator comprises ceramic, glass, an insulative polymer, or a combination thereof.

4. The fitting of claim 2, further comprising a second insulator configured to inhibit electrical contact between the interior surface of the elongate member and one or more of the connector, the inner conductor of the first insulated lead, and the inner conductor of the second insulation lead.

5. The fitting of claim 4, wherein the first insulator and the second insulator are different.

6. The fitting of claim 1, wherein the connector is a crimp connector.

7. The fitting of claim 1, wherein the first end, the second end, or a combination thereof is configured to receive the connector.

8. The fitting of claim 1, wherein at least one of the first collar and the second collar comprises internal threads and at least one of the first end and the second end comprises external threads suitable to receive the internal threads.

9. The fitting of claim 1, wherein the elongate member comprises a metal.

10. The fitting of claim 1, wherein the fitting comprises one or more of a metal, a graphite, and a ceramic.

11. A kit for forming a hot-cold junction, a hot-hot junction, a cold-cold junction, or a combination thereof, the kit comprising:
the fitting of claim 1; and
a second insulator.

12. A kit for forming a hot-cold junction, a hot-hot junction, a cold-cold junction, or a combination thereof, the kit comprising:
a fitting for electrically connecting a first insulated lead to a second insulated lead in a heat trace cable, the fitting comprising:
an elongate member comprising an open first end, an open second end, and an interior surface defining an elongate cavity;
a first sleeve, a second sleeve, and a third sleeve, each sleeve configured to receive at least one of the insulated leads, wherein at least one of the first open end and the second open end is configured to receive the first sleeve, the second sleeve, and the third sleeve, wherein at least two of the sleeves are different sizes;
a first collar configured to compress at least one of the sleeves onto the first insulated lead to form a seal between the first insulated lead and the elongate member;
a second collar configured to compress at least one of the sleeves onto the second insulated lead to form a seal between the second insulated lead and the elongate member; and
a connector configured to be received by elongate cavity, the connector configured to electrically connect an inner conductor of the first insulated lead with an inner conductor of the second insulated lead;
a first insulator configured to inhibit electrical contact between the interior surface of the elongate member and one or more of the connector, the inner conductor of the first insulated lead, and the inner conductor of the second insulation lead.

13. A method comprising:
disposing a first insulated lead of a heat trace cable into a sleeve cavity of a first sleeve of a fitting and a second insulated lead of the heat trace cable into a sleeve cavity of a second sleeve of the fitting, the fitting comprising:
an elongate member comprising a first end, a second end, and an interior surface defining an elongate cavity, wherein the first end and second end are open;
the first sleeve and the second sleeve; and
a first collar and a second collar, wherein the fitting is configured to operate at a temperature greater than 700 degrees Fahrenheit;
electrically connecting an inner conductor of the first insulated lead and an inner conductor of the second insulated lead utilizing a connector;
disposing the connector into the elongate cavity of the fitting;
positioning a first insulator intermediate the connector the interior surface;
compressing the first sleeve onto the first insulated lead with the first collar to form a seal between the first insulated lead and the elongate member; and
compressing the second sleeve onto the second insulated lead with the second collar to form a seal between the second insulated lead and the elongate member, thereby forming a hot-hot junction, a hot-cold junction, or a cold-cold junction.

14. The method of claim 13, wherein the first collar comprises internal threads and the first end comprises external threads suitable to receive the internal threads of the first collar, and compressing the first sleeve onto the first insulated lead comprises torqueing the first collar onto the first end of the elongate member.

15. The method of claim 13, further comprising removing at least a first region of an outer layer of the first insulated lead, the second insulated lead, or a combination thereof, to from an exposed region comprising the inner conductor of the respective insulated lead.

16. The method of claim 13, wherein the first insulator comprises a tubular insulator, a tape insulator, a powder insulator, or a combination thereof.

17. The method of claim 13, wherein the electrically connecting comprises crimping the connector onto the inner conductor of the first insulated lead and the inner conductor of the second insulated lead.

18. A fitting for electrically connecting a first insulated lead to a second insulated lead in a heat trace cable, the fitting comprising:
an elongate member comprising an open first end, an open second end, and an interior surface defining an elongate cavity;
a first sleeve integral with the elongate member and configured to receive the first insulated lead, wherein the first end is configured to receive the first sleeve;
a second sleeve integral with the elongate member and configured to receive the second insulated lead, wherein the second end is configured to receive the second sleeve;
a first collar configured to compress the first sleeve onto the first insulated lead to form a seal between the first insulated lead and the elongate member;
a second collar configured to compress the second sleeve onto the second insulated lead to form a seal between the second insulated lead and the elongate member;
a connector configured to be received by elongate cavity, the connector configured to electrically connect an inner conductor of the first insulated lead with an inner conductor of the second insulated lead; and
a first insulator configured to inhibit electrical contact between the interior surface of the elongate member and one or more of the connector, the inner conductor of the first insulated lead, and the inner conductor of the second insulation lead.

19. A kit for forming a hot-cold junction, a hot-hot junction, a cold-cold junction, or a combination thereof, the kit comprising:
the fitting of claim 18; and
a second insulator.

* * * * *